United States Patent [19]
Griner et al.

[11] 3,859,030
[45] Jan. 7, 1975

[54] APPARATUS FOR AND METHOD OF MAKING PASTRY CUPS AND THE LIKE

[75] Inventors: Arthur J. Griner, Wyckoff; Daniel Anthony Koppa, Bloomfield, both of N.J.

[73] Assignee: Nabisco, Inc., New York, N.Y.

[22] Filed: May 1, 1973

[21] Appl. No.: 356,203

Related U.S. Application Data
[62] Division of Ser. No. 103,707, Jan. 4, 1971.

[52] U.S. Cl. ............ 425/450.1, 425/348 S, 249/170
[51] Int. Cl. .............................................. B29c 1/16
[58] Field of Search ........... 425/136, 138, 259, 261, 425/348 S, 348 R, 350, 450 R, 450 C, 451, 424, 432, 414, DIG. 127; 249/63, 64, 167, 170, 122; 99/373, 443, 442

[56] References Cited
UNITED STATES PATENTS

| | | | |
|---|---|---|---|
| 1,152,208 | 8/1915 | Pany | 425/DIG. 127 |
| 1,732,096 | 10/1929 | Lapkin | 425/348 S |
| 3,084,390 | 4/1963 | Anderson | 425/DIG. 127 |

*Primary Examiner*—Andrew R. Juhasz
*Assistant Examiner*—David S. Safran
*Attorney, Agent, or Firm*—Dale A. Bauer

[57] ABSTRACT

Apparatus for making products, such as pastry cups, ice cream cones and the like including split molds with mold opening and closing means.

9 Claims, 8 Drawing Figures

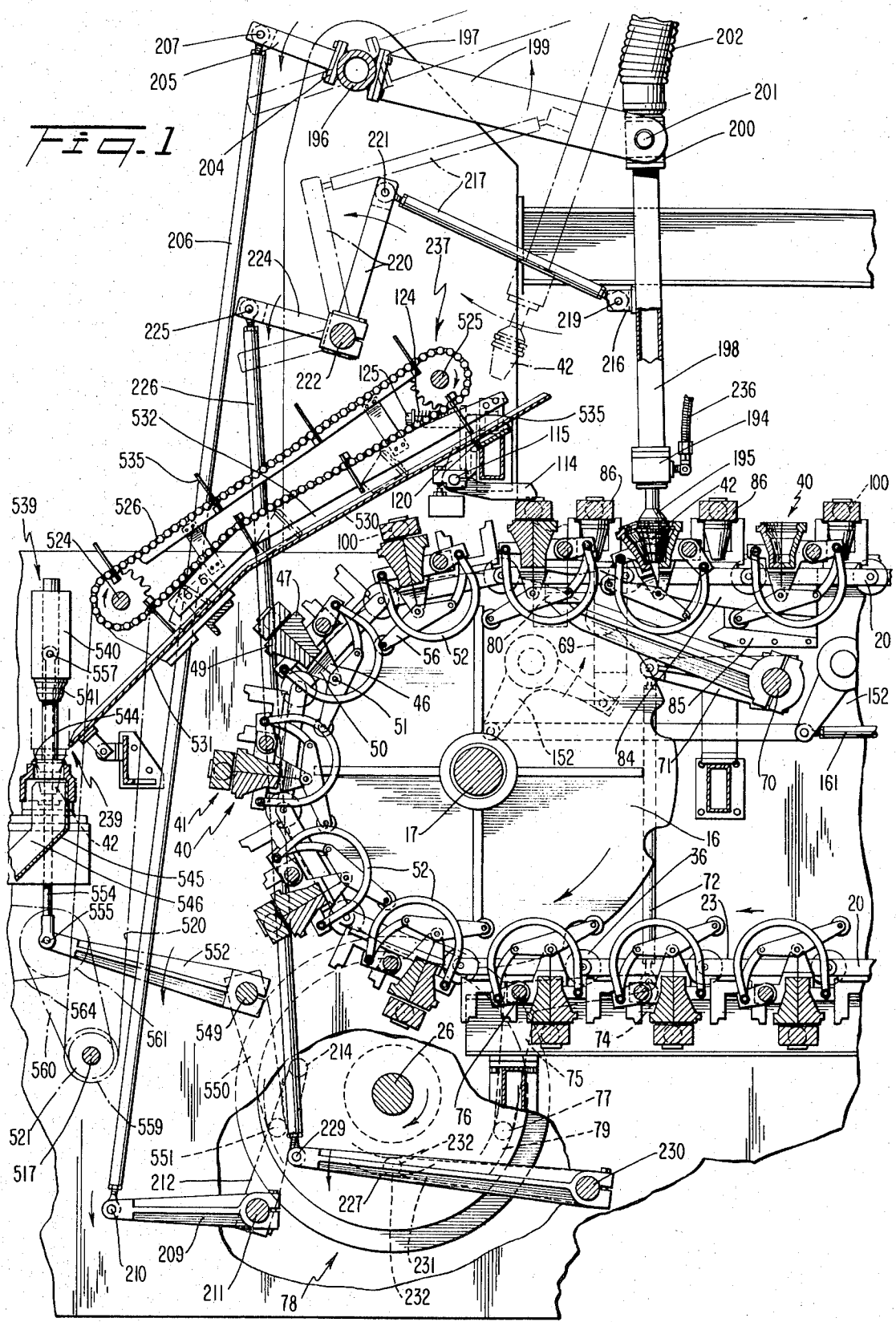

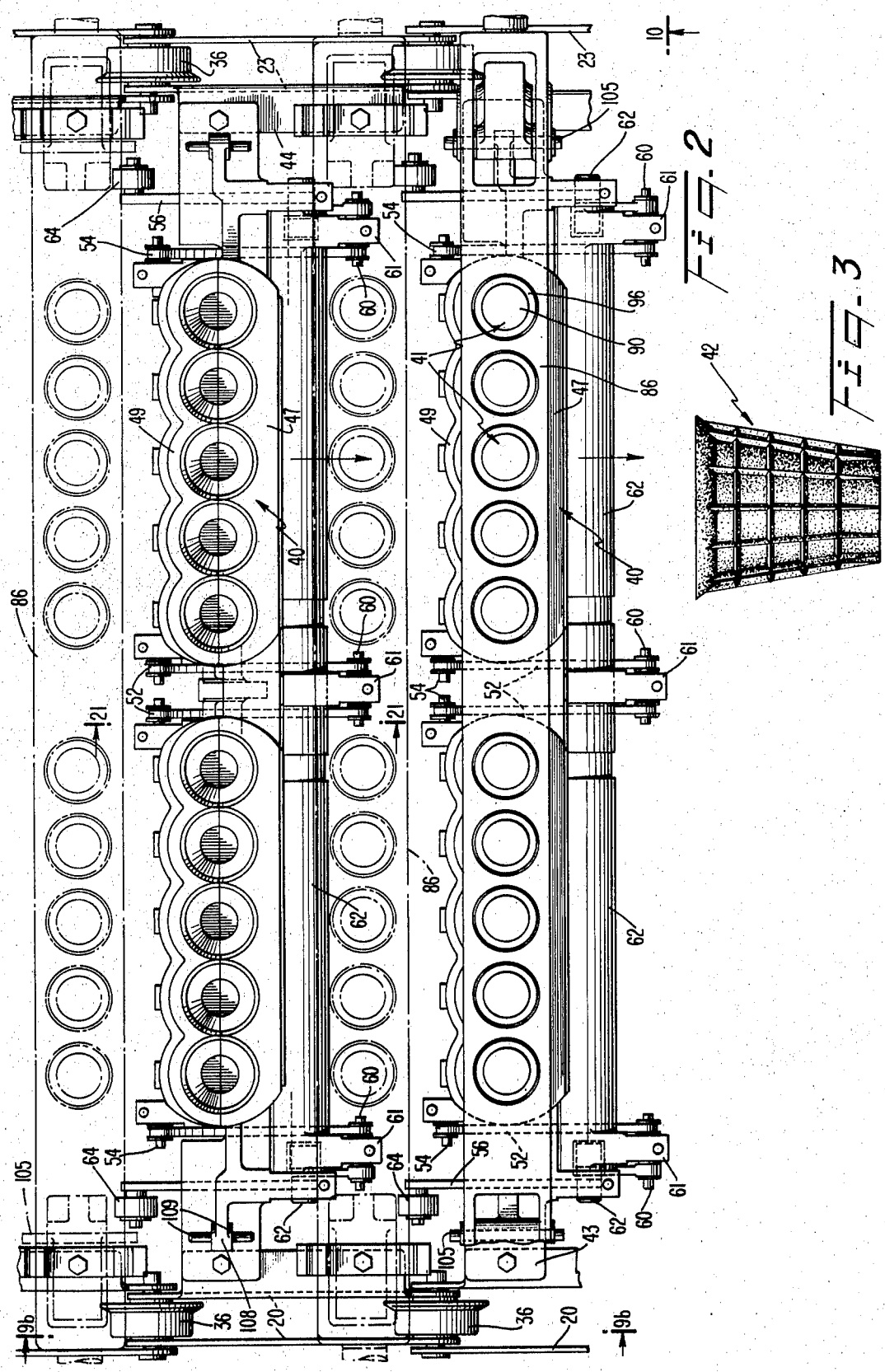

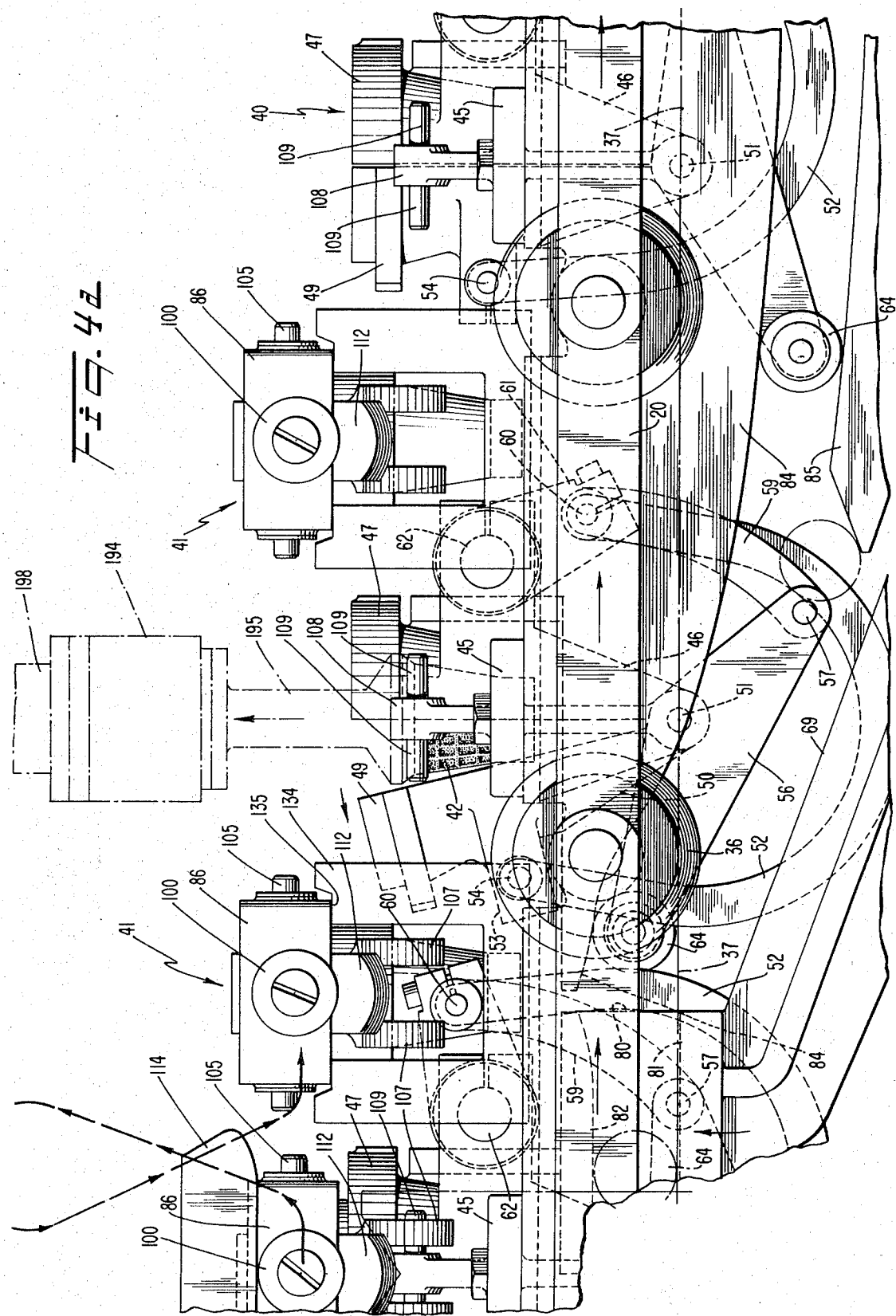

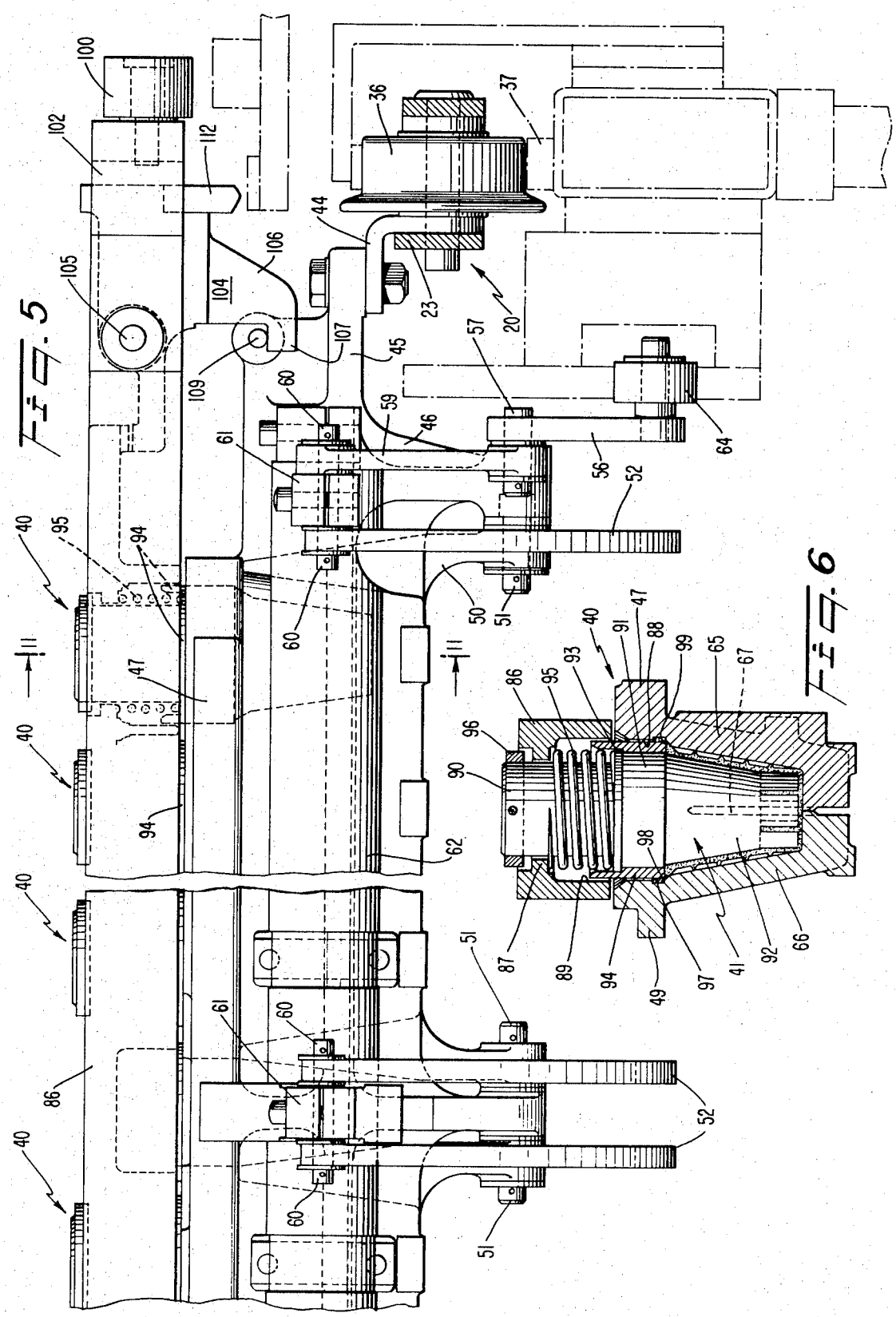

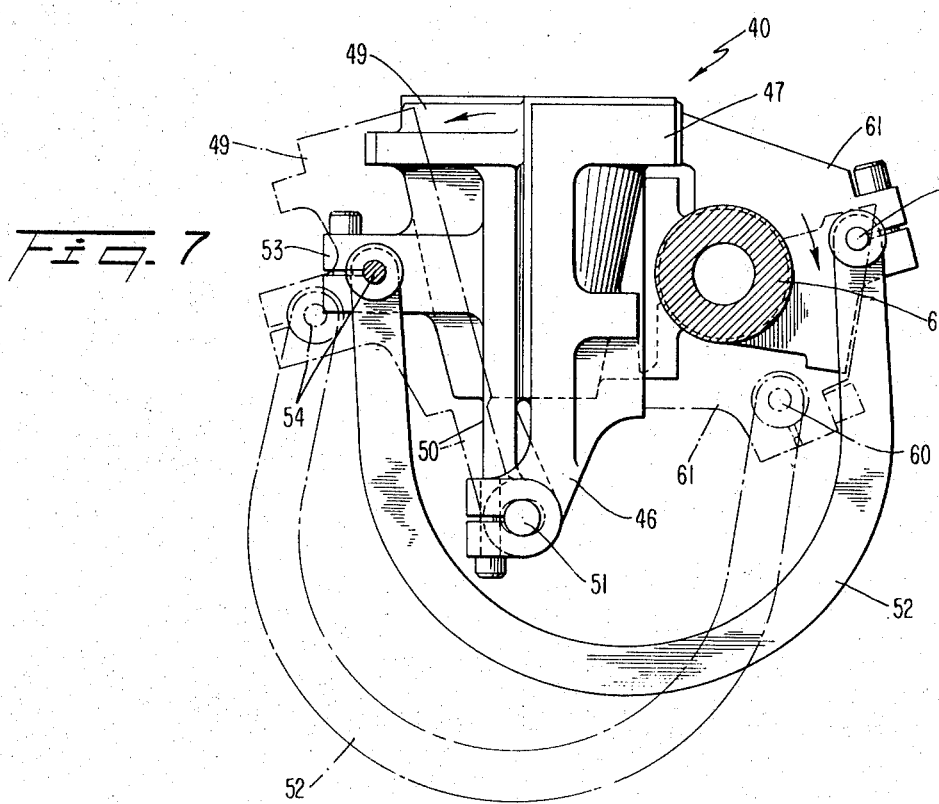

APPARATUS FOR AND METHOD OF MAKING PASTRY CUPS AND THE LIKE

This is a division of application Ser. No. 103,707, filed Jan. 4, 1971.

This invention relates to an apparatus for making molded products such as pastry cups or cones in molds provided with removable cores.

An object of the invention is the provision of split molds having novel mold opening, closing, and locking means.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a fragmentary view in vertical longitudinal section at the front end of the apparatus embodying the invention.

FIG. 2 is a fragmentary view in plan of the apparatus of FIG. 4b;

FIG. 3 is a view in side elevation of the cone or cup produced by the machine;

FIG. 4a is a view in side elevation of the upper reach of a conveyor chain, molds, and core bar storage means in generally that portion of the apparatus which is shown in FIG. 1, one of the molds being shown open and the product being about to be discharged therefrom;

FIG. 5 is a rear elevation view of one end portion of a mold bar and a core bar assembly mounted on the conveyor chain, the view being taken along the line 10—10 of FIG. 2;

FIG. 6 is a view in vertical axial section through a mated mold and core filled with batter, the core being shown in elevation, the section being taken along the line 11—11 of FIG. 5;

FIG. 7 is a view partially in elevation and partially in vertical section through a mold bar assembly, the parts being shown in solid lines in mold closed position and in phantom lines in mold open position, the section being taken along the line 21—21 of FIG. 2.

Figure 4B:
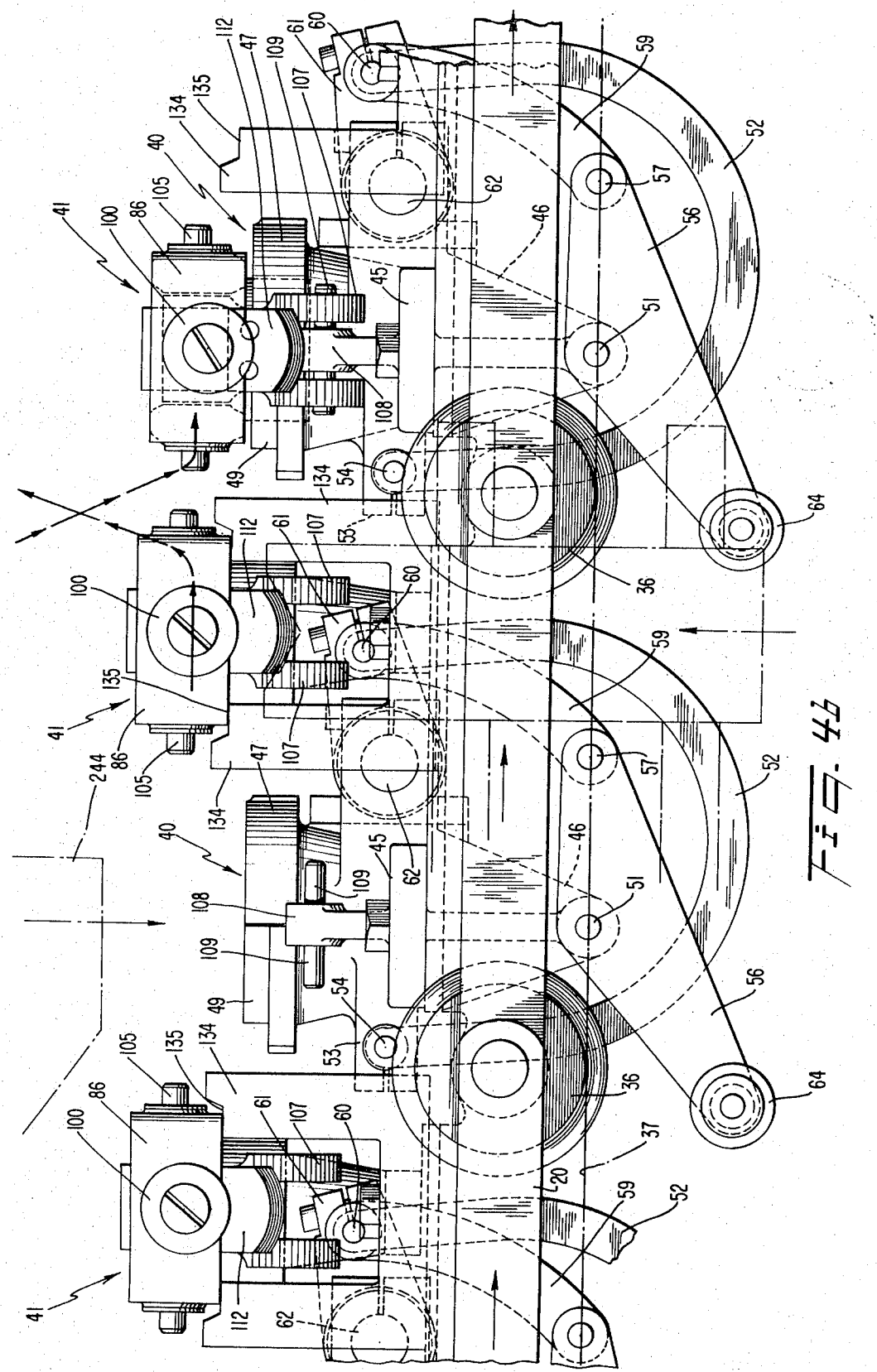
FIG. 4b is a view in side elevation similar to FIG. 4a but of a portion of the upper reach of the conveyor rearwardly or downstream of that shown in FIG. 4a, the view being taken along the line 9b—9b of FIG. 2, FIGS. 4a and 4b taken together showing a continuous portion of the conveyor with molds and core bar storage means of the apparatus.

The illustrative machine has conveyor comprising two similar conveyor chains 20 each having laterally spaced links 23 entrained over the sprockets 16 as shown in FIG. 1. The sprockets 16 are driven by a motor (not shown).

The chains 20 are provided with supporting rollers 36, such rollers being journalled on stub shafts which connect successive links 23 of the chain together. Upper horizontal tracks 37 (FIG. 5) support the upper runs of said chains. Mounted upon the chains 20 on transversely disposed mold bar assemblies 45, to be described, are a plurality of molds 40, there being two transversely aligned sets, each containing five molds, in each of the mold bar assemblies in the embodiment shown. Transversely disposed core bars 86 carry cores 41 for cooperation with the molds 40. As will be seen hereinafter, the core bars are disposed in mating cooperating relationship with the mold bar assemblies throughout the entire length of the chains 20 with the exception of a relatively short portion of the machine in which the core bars are removed from the mold bar assemblies and temporarily stored to permit the removal of the baked cones from the molds and the filling of the molds prior to the reinsertion of cores therein. The product produced by the illustrative apparatus is a frusto-conical or flat bottomed cone or cup which is shown at 42 in FIG. 3.

THE MOLD STRUCTURE

As shown in FIG. 5, right angled brackets 44 are affixed to the chains 20, the vertical flange of each bracket being disposed outwardly of the inner link 23 of the chain, and the other flange of the bracket being disposed horizontally and extending laterally inwardly. Mold bar assemblies 45, which extend transversely of the machine between the spaced chains 20, are provided with ears 43 at their opposite ends, such ears being bolted to the horizontal flanges of the brackets 44. The molds 40 of each mold bar assembly are split vertically along their transverse central planes, being formed of ten semi-frusto-conical cavities in a fixed body portion 43, 47 and confronting semi-frusto-conical cavities in two pivoted body portions 49, each having five such cavities. The leading mold bar portion 47 and the trailing mold bar portions 49 are pivotally connected by depending ears 46 at the ends and center of fixed portion 47, cooperating depending ears 50 on the ends of mold parts 49, and horizontal stub shafts 51 through the sets of ears 46 and 50 adjacent their lower ends. The mold parts 47, 49 are forcibly held together, so that the mold cavities are substantially liquid-tight, by stiff arcuate springs 52 (four shown) which are disposed in vertical planes longitudinally of the machine. One set of ears 46, 50 and a spring 52 are disposed at each end of the mold bar 47, 49, and one set of ears 46, 50 and two springs 52, one at each side of the last set of ears, are disposed centrally of the machine between the two transversely aligned rows of five molds each formed by the mold parts 47, 49.

The trailing end of each of the springs 52 is pivotally connected by a pin 54 to a projection 53 extending from the trailing edges of the movable mold bar portions 49. A first-class lever 56 at each end of a mold bar assembly 47, 49 is pivoted intermediate its length on a stub shaft 51 which pivotally connects the fixed and movable mold bar parts 47, 49 together at their lower ends. The leading ends of the levers 56 are pivotally connected at 57 to curved links 59, the forward end of each of such links and springs 52 being pivotally connected at 60 to the outer free ends of arms 61 which are secured to and extend radially from the center and each end of a shaft 62 pivotally mounted at its ends in mold bar portion 43, 47.

The springs 52, the links 59, levers 56 and the lever arms 61 are so constructed and arranged that when the mold bar parts 47 and 49 are together and the molds are thus closed as shown in FIG. 4b the arms 61 are inclined somewhat upwardly from the axis of pivot shaft 62. The springs 52 and the lever arms 61 in effect constitute a toggle which is in over-center position when the molds are closed, the ends of each spring 52 then being spread and hence under tension so that the springs strongly urge the mold parts 47 and 49 together. In the illustrative machine, each spring 52 is somewhat more relaxed with the ends thereof closer together when the molds are open as seen in phantom in FIGS. 4a and 7.

The portions of the mold bars 47, 49 which form the opposed halves of an individual mold are designated 65 and 66 in FIG. 6. Such mold halves meet along side and bottom edges 67. Such engaging edges 67 are preferably made relatively thin as shown, whereby to increase the unit pressure imposed thereon by the springs 52 to insure a good seal between the closed mold halves. Also, the mold halves in each group or row of five are so made that when they are closed, the walls of the mold at the middle of the row engage each other first and hence somewhat more forcibly than the walls of the other molds, whereby to pre-stress the walls of the middle mold and to prevent leakage of all of the molds when the same are subjected to heat.

The ends of the trailing arms of the levers 56 are provided with rollers 64 which engage cam tracks, to be described, whereby to swing the levers 56 clockwise (FIG. 4b) so as to open the molds. When the molds are thus opened, as shown centrally in FIG. 4a, the effective diameter of the springs 52 between pivots 54 and 60 is decreased, and the tension thereof is diminished.

THE MOLD OPENING AND CLOSING MECHANISM

The respective rollers 64 on the levers 56 at each end of the travelling mold bar assemblies are sequentially received within an open-ended cam "box" 80 adjacent each side of the machine (FIGS. 1 and 4a). Each cam box or track 80 has lower and upper surfaces 81 and 82. The tracks 80 are formed in the outer free ends of two similar laterally spaced levers 69 which are fixedly secured to a transverse rock shaft 70 journalled in the side frame members of the machine. A lever arm 71 (FIG. 2) affixed to the rock shaft 70 is pivotally connected to a vertical link 72, the lower end of which is pivotally connected at 74 to the end of a substantially horizontal arm of a bell crank lever 75 mounted on a cross shaft 76. A cam follower roll 77 is journalled on the lower end of the second, substantially vertical arm of the bell crank 75. Such cam follower rides upon the surface of a suitable cam 79 which is fixed to the cross shaft 26 within the cam case 78. The cam 79 is of such configuration that after the rollers 64 have entered the tracks 80 the lever arms 69 are pivoted clockwise (FIG. 1) so as to lift said tracks and swing the levers 56 clockwise and thus open the molds of that particular mold bar assembly which is approaching the product discharge station. After the rollers 64 have passed through the raised cam tracks 80, the same are moved down by the linkage 69, 71, 72, 75 and cam 79 or by resilient means to be in position to receive the rollers 64 on the next mold bar assembly. The molds in the opened set thereof are maintained stably open until after the baked cones have been removed therefrom, following which the levers 56 are forcibly swung counterclockwise (FIGS. 1 and 4a) to close the molds in readiness for their being charged with batter. The closing of the molds is effected as follows. The followers 64, travelling ith the molds, are received beneath stationary upper cam tracks 84. Cam tracks 84 gradually rotate the levers 56 counterclockwise as the molds travel to the right (FIG. 4a). As the levers 56 approach their terminal, mold-closed position, the rollers 64 enter slightly inclined tracks between cams 84 and lower fixed cams 85. The rollers 64 are now trapped between the stationary cams 84, 85 and are gradually brought into their final, mold-closed position (FIG. 4b).

The entire disclosure of applicants' above-mentioned parent application Ser. No. 103,707 is incorporated herein by this reference.

Although only one embodiment of the invention is illustrated in the accompanying drawings and described in the foregoing specification, it is to be expressly understood that various changes, such as in the relative arrangement and dimensions of the parts, may be made therein without departing from the spirit and scope of the invention, as will now be apparent to those skilled in the art.

What is claimed is:

1. In molding apparatus, a split mold comprising a first, relatively fixed mold part and a second mold part movable relative thereto and cooperable therewith to form a cavity, and means for opening and closing the mold comprising a crank arm journalled on one of the mold parts and extending generally away from the other mold part, a link in the form of a tension spring extending from the outer end of the crank arm to the other mold part, and means for oscillating the crank arm between a mold-closed position, wherein the crank arm lies beyond dead center in one direction with the spring under marked tension to hold the mold closed, and a mold-open position, wherein the crank arm lies beyond dead center in the other direction with the spring relatively relaxed.

2. Apparatus according to claim 1, wherein the first and second mold parts are in the form of elongated bars each containing complementary parts of a plurality of mold cavities spaced along the bars, and comprising a plurality of said spring links spaced longitudinally of said bars.

3. Apparatus according to claim 2 wherein the confronting surfaces of the mold parts are of such configuration that the confronting edges of the mold cavities centrally of the length of the mold parts engage each other slightly before the edges of the other mold cavities as the molds are closed, whereby to prestress the central portions of the mold parts.

4. Apparatus according to claim 1 wherein the spring link is of U-shape and is resiliently distortable in both directions from an intermediate relaxed configuration.

5. Apparatus according to claim 4 wherein the U-shaped link is markedly expanded when the mold is closed and is relatively relaxed when the mold is open.

6. Apparatus according to claim 1 wherein the two parts of the mold are pivotally connected at one end thereof.

7. Apparatus according to claim 6 wherein the crank arm is journalled on the fixed mold part at a location markedly spaced from the pivotal connection of the mold parts, and the spring link is pivotally connected to the crank arm and to the movable mold part at a location markedly spaced from the pivotal connection of the mold parts.

8. Apparatus according to claim 6 wherein the means for oscillating the crank arm comprises a linkage having pivotally connected first and second levers, the first lever being pivotally connected to the fixed mold part and the second lever being pivotally connected to the crank arm.

9. Apparatus according to claim 8 comprising conveyor means on which said mold and said mold opening and closing means is carried, and cam means cooperable with said first lever to effect oscillation of the latter about its pivotal connection to the fixed mold part to thereby open and close the mold.

* * * * *